US009449366B2

(12) United States Patent
Wong et al.

(10) Patent No.: US 9,449,366 B2
(45) Date of Patent: Sep. 20, 2016

(54) BAYER-CONSISTENT RAW SCALING

(71) Applicant: Sony Corporation, Tokyo (JP)

(72) Inventors: Ping Wah Wong, Sunnyvale, CA (US); Thomas Richard Ayers, Morgan Hill, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/496,865

(22) Filed: Sep. 25, 2014

(65) Prior Publication Data

US 2016/0093016 A1    Mar. 31, 2016

(51) Int. Cl.
| | |
|---|---|
| G06K 9/32 | (2006.01) |
| G06T 3/40 | (2006.01) |
| G06T 3/00 | (2006.01) |
| G06T 5/00 | (2006.01) |
| G06T 7/00 | (2006.01) |
| G06T 7/40 | (2006.01) |

(52) U.S. Cl.
CPC ........... *G06T 3/4015* (2013.01); *G06T 3/0056* (2013.01); *G06T 3/4007* (2013.01); *G06T 3/4076* (2013.01); *G06T 5/006* (2013.01); *G06T 7/0059* (2013.01); *G06T 7/408* (2013.01); *G06T 2200/21* (2013.01); *G06T 2200/32* (2013.01); *G06T 2207/10004* (2013.01); *G06T 2207/10024* (2013.01); *G06T 2207/20182* (2013.01); *G06T 2210/36* (2013.01)

(58) Field of Classification Search
CPC ..... G06T 3/40; G06T 3/4007; G06T 3/4023; G06T 3/4053; H04N 9/045; H04N 9/735; H04N 19/80
See application file for complete search history.

(56) References Cited

U.S. PATENT DOCUMENTS

| | | | | |
|---|---|---|---|---|
| 2008/0260291 | A1* | 10/2008 | Alakarhu | G06T 3/4015 382/298 |
| 2008/0266310 | A1* | 10/2008 | Chalmers | G06T 3/4015 345/589 |
| 2011/0261217 | A1* | 10/2011 | Muukki | G06T 3/4015 348/222.1 |
| 2011/0274349 | A1* | 11/2011 | Kalevo | H04N 5/23229 382/166 |
| 2012/0050567 | A1* | 3/2012 | Cote | H04N 9/68 348/224.1 |
| 2013/0229531 | A1* | 9/2013 | Zhang | H04N 17/002 348/187 |

* cited by examiner

*Primary Examiner* — Phuoc Tran
(74) *Attorney, Agent, or Firm* — Michael Best & Friedrich LLP

(57) ABSTRACT

A system and method for scaling an image includes receiving raw image data comprising input pixel values which correspond to pixels of an image sensor; and filtering pixels according to a Bayer-consistent ruleset. The system and method may also include outputting scaled image data as output pixel values, which correspond to subgroups of the input pixel values. The Bayer-consistent ruleset includes a set of filter weights and a series of scaling rules. The Bayer-consistent ruleset results in a scaled image having a high degree of Bayer-consistency.

18 Claims, 10 Drawing Sheets

R

| 1 | 0 | 1 | 0 | 0 | 0 |
|---|---|---|---|---|---|
| 0 | 0 | 0 | 0 | 0 | 0 |
| 1 | 0 | 1 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

$\frac{1}{4} \times$

G1

| 0 | 0 | 0 | 1 | 0 | 1 |
|---|---|---|---|---|---|
| 0 | 0 | 0 | 0 | 0 | 0 |
| 0 | 0 | 0 | 1 | 0 | 1 |
| 0 | 0 | 0 | 0 | 0 | 0 |
| 0 | 0 | 0 | 0 | 0 | 0 |
| 0 | 0 | 0 | 0 | 0 | 0 |

$\frac{1}{4} \times$

G2

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 1 | 0 | 1 | 0 | 0 | 0 |
| 0 | 0 | 0 | 0 | 0 | 0 |
| 1 | 0 | 1 | 0 | 0 | 0 |

$\frac{1}{4} \times$

B

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 1 | 0 | 1 |
| 0 | 0 | 0 | 0 | 0 | 0 |
| 0 | 0 | 0 | 1 | 0 | 1 |

$\frac{1}{4} \times$

BAYER-CONSISTENT RAW SCALING

BACKGROUND OF THE INVENTION

1. Field of the Invention

This application relates generally to digital image scaling. More specifically, this application relates to a raw domain image scaling system and method that maintains Bayer consistency.

2. Description of Related Art

In a digital image capturing system, it is common that the resolution requirement for still image capture is higher than that of video output. In such a case, a high-resolution camera capable of supporting the resolution requirement of still image capture is often used. When the camera is used in video mode to produce a video output stream, the data is scaled down to suit the resolution of the video output. For example, a particular image sensor with 8 million pixels (megapixels or MP) can give 8 MP still images. For the same image sensor in video mode, a resolution of 1080×1920 pixels, or approximately 2 MP, may suffice to produce 1080p high-definition (HD) video. Therefore, in 1080p video mode, the image data is scaled down 3× both vertically and horizontally to provide the desired output resolution.

This scaling may be performed either in the raw domain or the RGB domain. An advantage of scaling the image data in the raw domain to the desired video resolution is that it reduces the number of pixels that must be processed through the system. As a result, a majority of processing blocks in an image pipeline or post-processing section can be operated at a lower clock rate than the clock rate required to support full-resolution processing. Operating the processing section at a lower clock rate has significant advantages in reducing electromagnetic interference and reducing power consumption of the system. These advantages are especially valuable in such applications as mobile imaging.

However, existing methods of scaling in the raw domain suffer from several disadvantages, including difficulty in maintaining a Bayer output pattern without resorting to increasingly complex, expensive, and resource-intensive logic circuitry. Additionally, such existing scaling methods suffer from inferior image quality when compared to scaling in the RGB domain.

Accordingly, there is a need for raw image scaling that can efficiently produce output images of high image quality (that is, with good resolution) which are free of the image artifacts produced by existing raw image scaling.

BRIEF SUMMARY OF THE INVENTION

Various aspects of the present disclosure relate to a system and method for scaling an image. The scaling includes receiving raw image data comprising a plurality of input pixel values, respective ones of the input pixel values corresponding to a respective pixel of an image sensor; filtering respective ones of the plurality of pixels according to a Bayer-consistent ruleset; and outputting scaled image data comprising a plurality of output pixel values, respective ones of the output pixel values corresponding to a subgroup of the plurality of input pixel values.

In one example, Bayer-consistent ruleset includes: a plurality of filter weights; a first rule that a respective output pixel value corresponds to a first color, and the corresponding subgroup of the plurality of input pixel values also corresponds to the first color; a second rule that the plurality of input pixel values corresponds to a plurality of input sub-tiles and the filter weights for the first color are concentrated within an input sub-tile of the same color; and a third rule that a center of gravity of the filter weights for the first color coincides with the geometric pixel center of the output pixel of the first color. The Bayer-consistent ruleset results in a scaled image having a high degree of Bayer-consistency.

In this manner, various aspects of the present disclosure provide for improvements in at least the underlying technical processes of image capturing and image processing.

This disclosure can be embodied in various forms, including business processes, computer-implemented methods, computer program products, computer systems and networks, user interfaces, application programming interfaces, hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which:

FIG. 8 illustrates an exemplary set of filter coefficient arrays for use with various aspects of the present disclosure.

FIG. 9 illustrates an exemplary set of optimized filter coefficient arrays for use with various aspects of the present disclosure.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

[Imaging System]

Figure 1A:
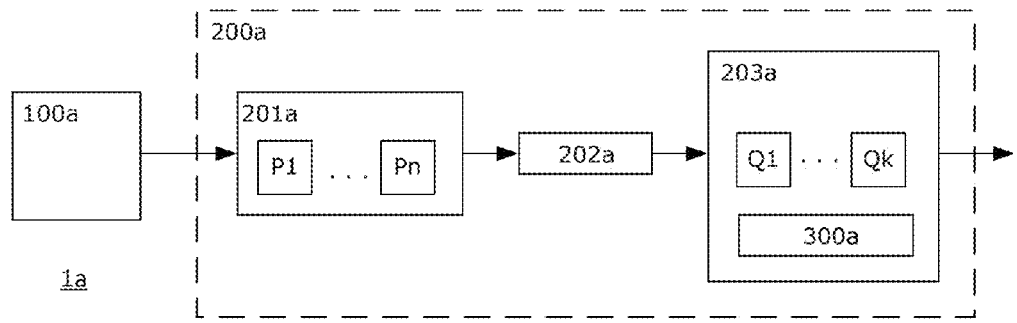
FIGS. 1A, 1B, and 1C respectively illustrate three different exemplary image capturing systems with image scaling according to various aspects of the present disclosure.
Figure 1B:
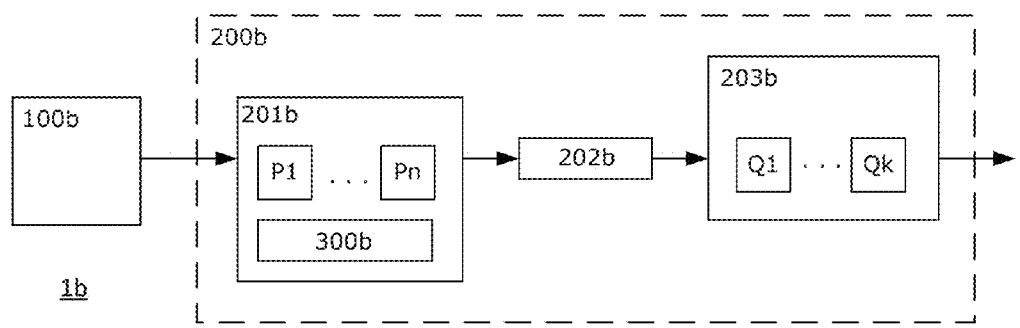
Figure 1C:
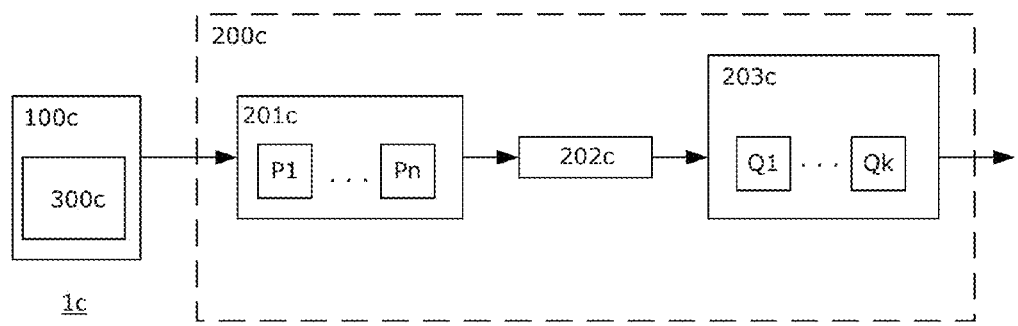

FIGS. 1A-C illustrate three different exemplary image capturing systems 1a-c that support both still image capture at full sensor resolution and video output at a desired video resolution. All three exemplary image capturing systems 1a-c include an image sensor 100a-c and an image pipeline 200a-c. FIG. 1A illustrates a system 1a where scaling is performed in the RGB domain within image pipeline 200a; FIG. 1B illustrates a system 1b where scaling is performed in the raw domain within image pipeline 200b; and FIG. 1C illustrates a system 1c where scaling is performed in the raw domain within image sensor 100c. As used herein, "scaling" means changing the resolution of the image data to the desired output video resolution.

In all three of FIGS. 1A-C, image pipeline 200a-c includes a raw domain processing section (for example, a raw domain processing circuit) 201a-c which comprises a series of raw domain processing blocks P1, . . . , Pn. These raw domain processing blocks process raw image data (also called raw pixel data) in the same format as they are captured from the image sensor. Additionally, image pipeline 200a-c includes a demosaic section (for example, a demosaic circuit) 202a-c which converts raw image data into full color image data; that is, data wherein each pixel includes all RGB values. Furthermore, image pipeline 200a-c includes an RGB domain processing section (for example, an RGB domain processing circuit) 203a-c which comprises a series of RGB domain processing blocks Q1, . . . , Qk. Examples of processing blocks or circuits in image pipeline 200a-c include lens artifact correction, bad pixel correction, color correction, noise filtering, sharpening, and the like.

In FIG. 1A, RGB domain processing section 203a includes an RGB scaling section (for example, a scaling circuit) 300a. In FIG. 1B, raw domain processing section 201b includes a raw scaling section 300b. In FIG. 1C, image sensor 100c includes scaling section 300c. While the three exemplary views show only a single RGB or raw scaling section, exemplary image capturing systems may have the capability of supporting both raw domain image scaling and RGB domain image scaling. In such case, both a raw scaling section and an RGB scaling section would be present in the same image capturing system. Such an arrangement would provide the user or system designer with the capability of selecting either raw scaling, RGB scaling, or both, to suit specific operating conditions as desired.

The raw scaling techniques described herein improve the functioning of the image sensor and/or the image pipeline by allowing it to produce output images of high quality with fewer artifacts.

Image pipeline 200a-c may be implemented either in hardware, software, or a mixture of both. Examples of hardware implementations include application specific integrated circuit (ASIC), field programming logic array (FPGA), other programmable logic circuits, discrete circuit elements, and the like. Examples of software implementations include firmware in an embedded chip, software in digital signal processors (DSP), software in a simulator, software in a graphics processing unit (GPU), software in a general purpose central processing unit (CPU), and the like. A mixture of hardware and software may also be used wherein some blocks in image pipeline 200a-c are implemented in hardware, with the remaining blocks implemented in software. In one example, one or more of image sensor 100a-c and image pipeline 200a-c, or subunits thereof, are implemented as a processing unit and a memory.

Figure 2A:
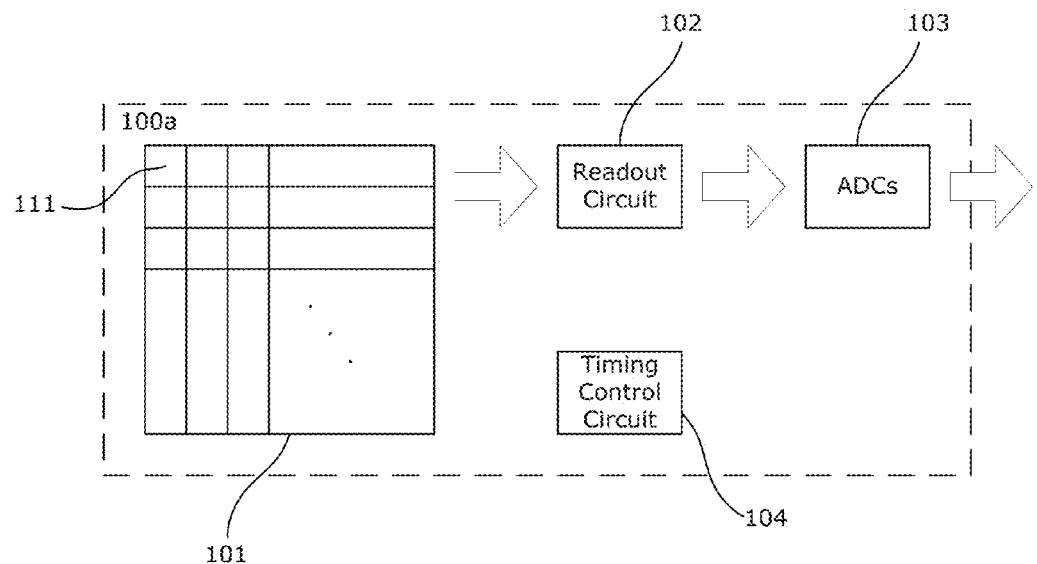
FIGS. 2A and 2B respectively illustrate an exemplary block diagram of an image sensor according to various aspects of the present disclosure.
Figure 2B:
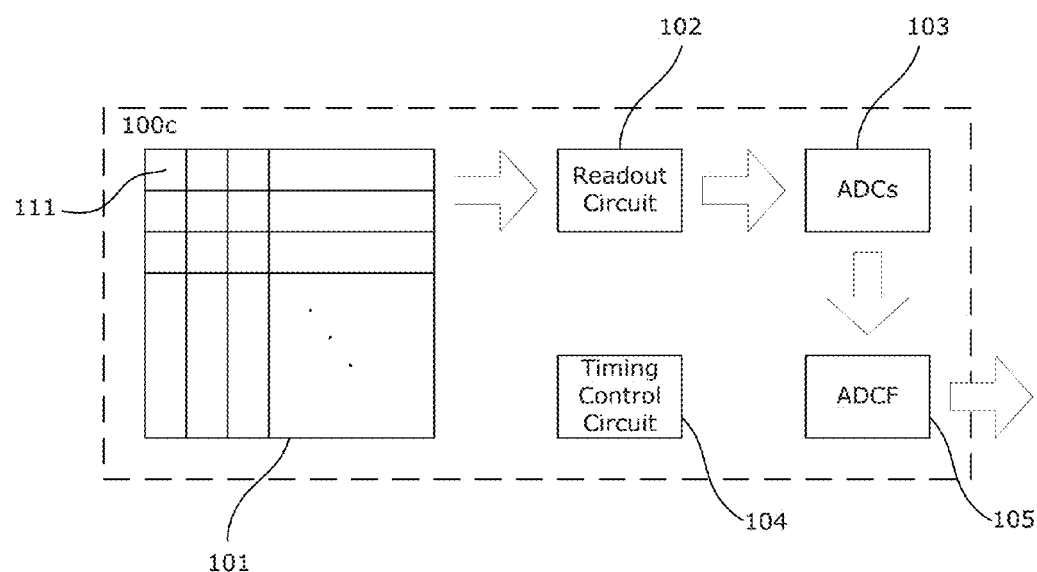

FIGS. 2A-B illustrate simplified block diagrams of exemplary image sensors 100a-c. FIG. 2A is an example of an image sensor 100a that does not itself perform scaling; for example, the image sensor 100a of FIG. 1A. FIG. 2B, on the other hand, is an example of an image sensor 100c that does perform scaling, as will be described in more detail below.

In FIG. 2A, image sensor 100a includes a pixel array 101, including a plurality of pixels 111 arranged in rows and columns. Individual pixels 111 include pixel elements such as a photosensitive element (for example, a photodiode) and associated control circuits (for example, transistors). The pixel array 101 is connected to a readout circuit 102 so that analog data values from pixels 111 may be sent to a bank of analog-to-digital converters (ADCs) 103, which convert the pixel data values into digital form. Pixel array 101, readout circuit 102, and ADCs 103 are controlled by a sequencer and timing control circuit 104 which controls the ordering of pixel reading operations and the timing of the circuit elements in pixel array 101. ADCs 103 may include single slope ADCs, cyclic ADCs, successive approximation ADCs, sigma-delta ADCs (also known as delta-sigma ADCs), and the like.

In FIG. 2B, ADCs 103 are sigma-delta ADCs. A sigma-delta ADC requires oversampling and gives out a sequence of D bit samples, where D is typically a low number such as 1. In order to generate multi-bit output digital values (for example, V-bit samples where V>D), a decimation filter is required which removes high frequency content in the D-bit sample sequence. Specifically, as illustrated in FIG. 2B, sigma-delta ADC 103 is operatively connected to an ADC filter block (ADCF) 105 to operate as a decimation filter. As will be discussed in more detail below, the raw domain image scaling calculations can be implemented with ADCF 105 as a single digital filter, which leads to a very efficient implementation that has several advantages.

In FIG. 2B, ADCF 105 is illustrated as being downstream from the ADC 103. In this manner, raw scaling in the digital domain may be performed. Alternatively or additionally, filters may be placed upstream from ADC 103 so as to perform raw scaling in the analog domain. In implementations where filters are placed both upstream and downstream from ADC 103, greater scaling flexibility may be achieved. For example, one can choose to filter either in the analog or digital domain, or may filter particular pixels (for example, filtering in the horizontal direction) in the analog domain and other pixels (for example, filtering in the vertical direction) in the digital domain.

Figure 3:
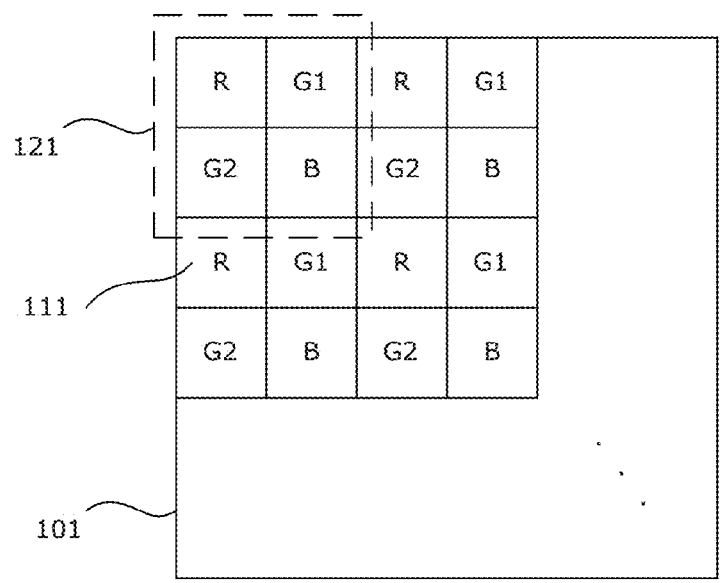
FIG. 3 illustrates an exemplary Bayer filter for use with various aspects of the present disclosure.

To provide for color images, a color filter array (CFA) is provided with image sensor 100, so that each pixel gives a data value corresponding to a single primary color. FIG. 3 illustrates a so-called "Bayer" CFA 101 for use with image sensor 100. In this example, R represents the pixels coated or provided with optical red filters, which therefore give only red pixel values. Similarly, β represents the pixels coated or provided with optical blue filters, which therefore give only blue pixel values. Both G1 and G2 represent pixels coated or provided with green optical filters, which therefore give only green pixel values. Because the green pixels sharing a row with red pixels and the green pixels sharing a row with blue pixels may have different pixel characteristics due to cross-talk and other reasons, they are labeled with the different notations G1 and G2, respectively. While the Bayer CFA illustrated in FIG. 3 uses an RGB layout, the CFA is not particularly limited in this regard. For example, other color arrangements are possible such as red/green/blue/white (RGBW); cyan/magenta/yellow (CMY); cyan/magenta/yellow/green (CMYG); and the like.

In FIG. 3, RGB Bayer CFA 101 comprises a tiled or repeating arrangement of 2×2 blocks 121 of pixels 111, comprising an R pixel in the upper left corner thereof, a G1 pixel in the upper right corner thereof, a G2 pixel in the lower left corner thereof, and a β pixel in the lower right corner thereof. One of ordinary skill in the art will readily recognize that other orderings are possible, such as B/G2/G1/R, G1/R/B/G2, G2/B/R/G1, and the like, as well as other primary or complementary color combinations such as C/M/Y/Y, or combinations of color and white such as R/G/B/W.

[General Scaling]

In practical imaging system implementations, the raw domain scaling method can be implemented either in hardware or software, or a mixture of both. For software implementations, the calculations in the scaling method can be implemented using embedded processors, digital signal processors, general purpose processors, software simulation units, and the like. For hardware implementations, the calculations in the scaling method can be implemented using digital means or analog means. Digital implementation in hardware uses digital logic elements such as gates, latches, arithmetic units, and the like. The logic elements can be included into an ASIC, an FPGA, discrete elements, or other programmable circuits. Analog implementation in hardware can include capacitive or resistive circuit elements such as summing junctions, voltage or current dividers, operational amplifiers, and the like.

The raw scaling method can be considered a filtering process followed by decimation. Scaling occurs according to a scaling factor $(1/N)X$, where a Bayer input region of $2N\times 2N$ is processed to produce a 2×2 Bayer output region.

Figure 4:
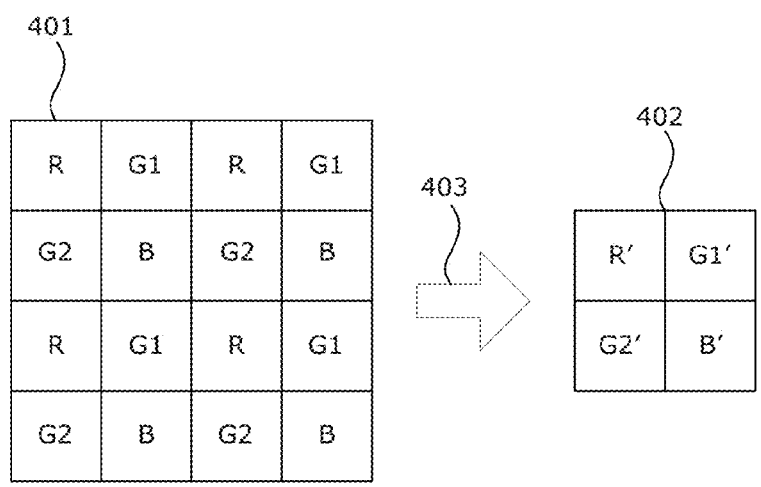
FIG. 4 illustrates an exemplary (½)X scaling operation according to various aspects of the present disclosure.

FIG. 4 illustrates a general example of a scaling method where N=2; that is, having a scaling factor of $(\frac{1}{2})X$. That is, the output data has a resolution in both the row and column directions which is ½ the resolution of the input data. In this example, a Bayer input region of 4×4 is processed to produce a 2×2 Bayer output region. As illustrated in FIG. 4, input raw data 401 is converted into scaled output data 402 by applying a scaling transformation 403, which is illustrated in more detail in FIG. 5.

Figure 5:
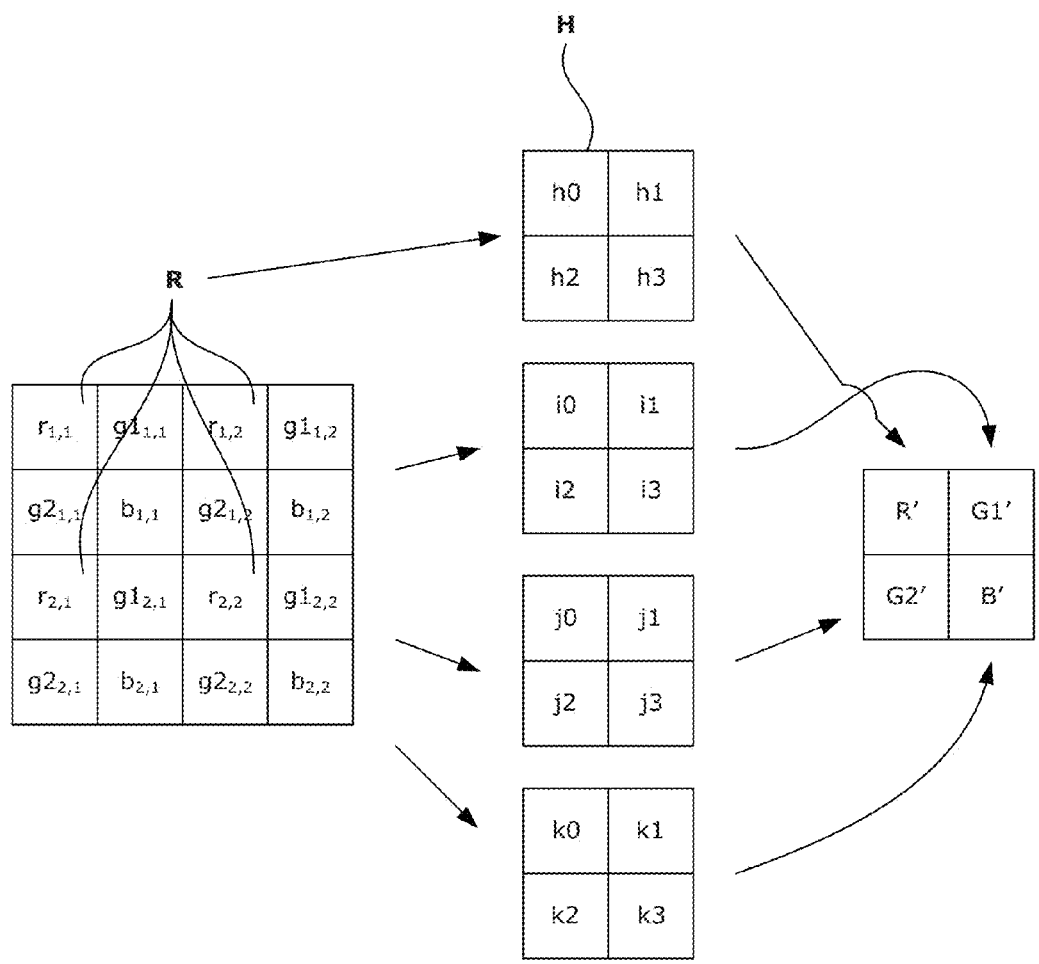
FIG. 5 illustrates an exemplary filtering representation for scaling according to various aspects of the present disclosure.

In FIG. 5, raw input pixels in each tile of size 4×4 are processed by four filters to give a 2×2 block in the output raw image. In the particularly illustrated filtering procedure, the pixel values of each red pixel are considered to be in a red pixel array R defined as $\{r_{1,1}, r_{1,2}, r_{2,1}, r_{2,2}\}$. Red pixel array R is operated on by a red filter coefficient array H defined as $\{h0, h1, h2, h3\}$ to provide an output red pixel R'. Specifically, each element of red pixel array R is multiplied by the corresponding element of red filter coefficient array H. That is, the coefficients in the red filter array are weights to be applied to the corresponding pixel values in the red pixel array. The products are then added together and divided by the sum of all elements of red filter coefficient array H to produce the output red pixel R'. Mathematically, this is represented by the following expression (1):

$$R' = \frac{r_{1,1}h0 + r_{1,2}h1 + r_{2,1}h2 + r_{2,2}h3}{h0 + h1 + h2 + h3} \quad (1)$$

Similarly, the pixel values of each green pixel in red rows are considered to be in a first green pixel array G1 defined as $\{g1_{1,1}, g1_{1,2}, g1_{2,1}, g1_{2,2}\}$ and are operated on by a first green filter coefficient array I defined as $\{i0, i1, i2, i3\}$ to output first green pixel G1'; the pixel values of each green pixel in blue rows are considered to be in a second green pixel array G2 defined as $\{g2_{1,1}, g2_{1,2}, g2_{2,1}, g2_{2,2}\}$ and are operated on by a second green filter coefficient array J defined as $\{j0, j1, j2, j3\}$ to output second green pixel G2'; and the pixel values of each blue pixel are considered to be in a blue pixel array β defined as $\{b_{1,1}, b_{1,2}, b_{2,1}, b_{2,2}\}$ and are operated on by a blue filter coefficient array K defined as $\{k0, k1, k2, k3\}$ to output blue pixel B'. These operations are represented by the following expressions (2)-(4):

$$G1' = \frac{g1_{1,1}i0 + g1_{1,2}i1 + g1_{2,1}i2 + g1_{2,2}i3}{i0 + i1 + i2 + i3} \quad (2)$$

$$G2' = \frac{g2_{1,1}j0 + g2_{1,2}j1 + g2_{2,1}j2 + g2_{2,2}j3}{j0 + j1 + j2 + j3} \quad (3)$$

$$B' = \frac{b_{1,1}k0 + b_{1,2}k1 + b_{2,1}k2 + b_{2,2}k3}{k0 + k1 + k2 + k3} \quad (4)$$

The filtering representation described above can be generalized to other scaling factors $(1/N)X$ for any integer N. For a scaling factor $(1/N)X$, an input region of size $2N\times 2N$ is used. In this manner, to produce an output pixel of a particular color, only input pixels of the same color are considered as an input to the filter. As a result, each filter array includes only $N^2$ coefficients. Alternatively, it is possible to calculate a particular color output pixel value using the pixels of other colors. In that case, the number of filter coefficients used for a scaling factor $(1/N)X$ will have more than $N^2$ terms. Additionally, the regions of support of the filters for a scaling factor $(1/N)X$ can be expanded beyond the $2N\times 2N$ region, and in such a case the number of filter coefficients used for a scaling factor $(1/N)X$ will also have more than $N^2$ terms.

[Pixel Skipping and Binning]

Conceptually, a pixel skipping method at a scaling factor $(1/N)X$ is one that tiles an original image with $2N\times 2N$ cells, and for each cell retains only the four pixels in a 2×2 configuration in the upper left corner of each cell. All other pixels in the cell are discarded or skipped.

Using the above filtering representation, raw pixel scaling using the pixel skipping method may be represented by the filters H={1, 0, 0, 0}; I={1, 0, 0, 0}; J={1, 0, 0, 0}; and K={1, 0, 0, 0}. For convenience of notation in the filter coefficient arrays, only the coefficients corresponding to pixels of the same color are written.

The pixel skipping method may lead to a loss of information because many pixels are simply ignored. That is, for a scaling factor of $(1/N)X$, only one out of every $N^2$ pixels are retained and the rest are discarded.

Conceptually, a binning method at a scaling factor $(1/N)X$ is one that tiles an input raw image with $2N\times 2N$ cells, and for each cell calculates the arithmetic averages of each color as the respective pixel values in a 2×2 cell of the output raw image. For purposes of this calculation, G1 and G2 are treated as different colors, even though they both correspond to the color green, and the averages for G1 and G2 are calculated independently.

Again using the above filtering representation, raw pixel scaling using the binning method may be represented by the filters H={¼, ¼, ¼, ¼}; I={¼, ¼, ¼, ¼}; J={¼, ¼, ¼, ¼}; and K={¼, ¼, ¼, ¼}. Again, for convenience of notation, only the coefficients corresponding to pixels of the same color are written.

In contrast to pixel skipping, binning represents an opposite approach where all the $N^2$ pixels are retained with equal weights in the output image. This may lead to a loss of resolution, create aliasing artifacts, result in uneven phase in pixels of different colors, and the like.

[Bayer-Consistent Scaling]

Pixel skipping and binning methods typically produce output images of sub-optimal quality; for example, having image artifacts, requiring expensive correction circuits, and the like. As a result, there is a need for a raw domain image scaling method which maintains Bayer consistency.

Figure 6:
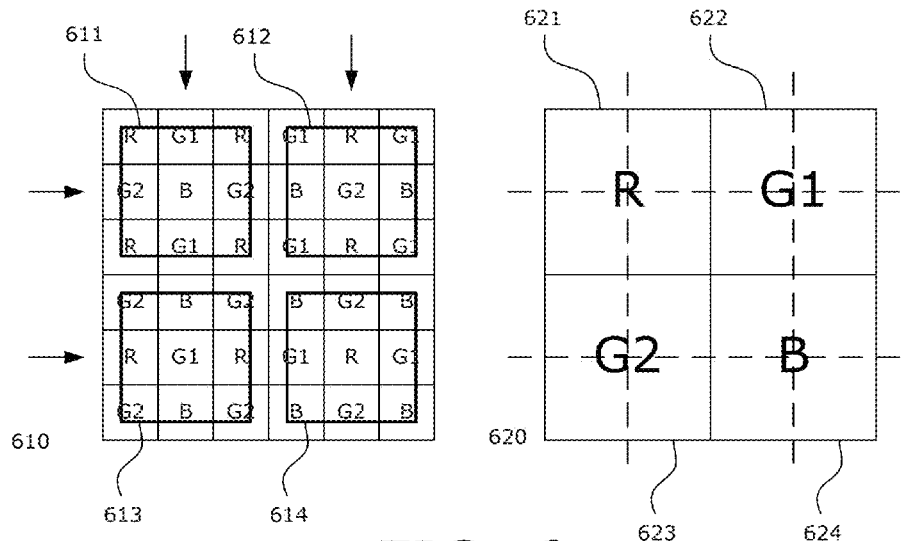
FIG. 6 illustrates an exemplary (⅓)X scaling operation according to various aspects of the present disclosure.

A raw domain image scaling method that maintains Bayer consistency is called "Bayer-consistent raw scaling" (BCRS). An example of BCRS with a scaling factor of (⅓)X (that is, N=3) is illustrated in FIG. 6. In this case, the input raw image is divided into tiles of size 6×6, and from each 6×6 input tile the scaling method calculates a 2×2 block of the output image. As illustrated, each 6×6 input tile 610 is divided into four 3×3 sub-tiles 611-614 that respectively represent the physical area of virtual pixel 621-624 in a block 620 of a virtual image sensor having a lower resolution equal to the scaled resolution. That is, the virtual image sensor would have ⅓ the resolution both vertically and horizontally compared to the actual image sensor used for capturing the raw image data.

Sub-tiles 611-614 are identified by the color of the corresponding virtual pixel 621-624, under the assumption that the virtual image sensor uses the same Bayer CFA as the actual image sensor. For example, sub-tile 611 is identified as an R sub-tile because it corresponds to virtual pixel 621, which is positioned where the R filter would be in a Bayer CFA on the virtual image sensor. Similarly, sub-tile 612 is identified as a G1 sub-tile, sub-tile 613 as a G2 sub-tile, and 614 as a β sub-tile.

Figure 7:
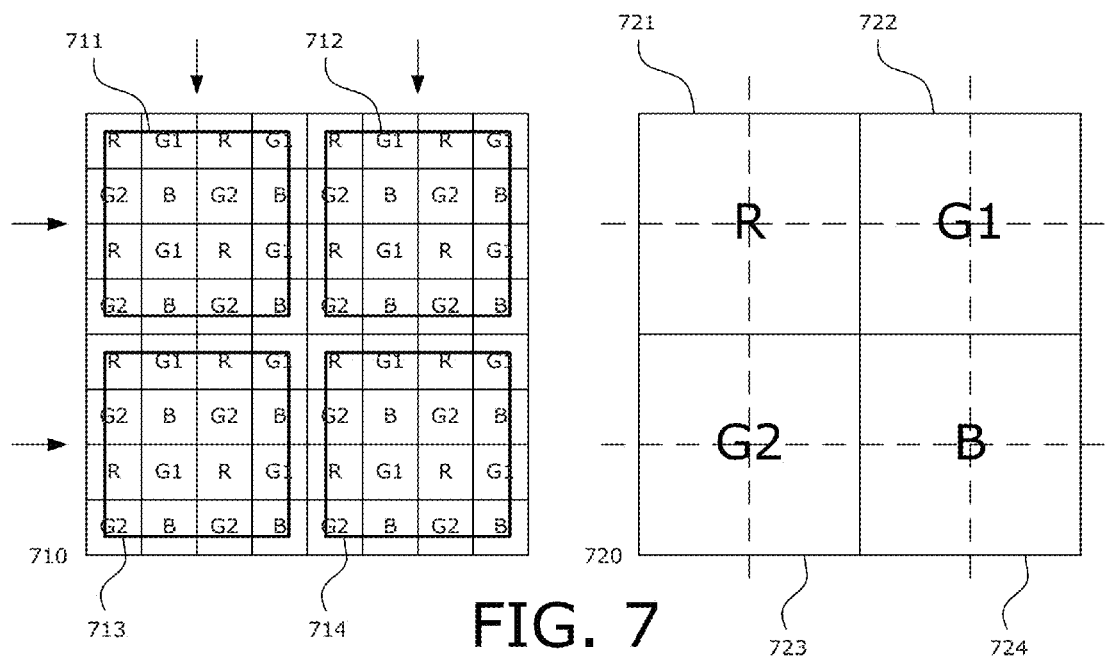
FIG. 7 illustrates an exemplary (¼)X scaling operation according to various aspects of the present disclosure.

A similar example of BCRS with a scaling factor of (¼)X is illustrated in FIG. 7. That is, the input raw image is divided into tiles of 8×8, and from each 8×8 input tile the scaling method calculates a 2×2 output block. Here, each 8×8 tile 710 is divided into four 4×4 sub-tiles 711-714 that respectively represent the physical area of a virtual pixel 721-724 in a block 720 of a virtual image sensor having a resolution equal to ¼ the resolution both vertically and horizontally compared to the actual image sensor.

In both FIGS. 6-7, the geometric pixel centers of the virtual pixels 621-624 and 721-724 are indicated by dashed lines. The corresponding physical locations are indicated by arrows in input tiles 610 and 710; these are collocated with the centers of the sub-tiles 611-614 and 711-714.

In light of the above requirements, BCRS is performed so as to satisfy the following conditions: (1) only input pixels of the same color as the output are used in the calculation of the output pixel value; (2) the filter weights are concentrated within the sub-tile of the same color; and (3) the center of gravity of the filter weights for each color coincides with the geometric pixel center of the output pixel of the same color. Taken together, these Bayer-consistency conditions form a Bayer-consistency ruleset, which provide for improved scaling quality.

To measure the degree of Bayer consistency, a criterion called a Bayer-consistency coefficient C may be defined which includes two components corresponding to conditions (2) and (3) above. The first component γ measures the concentration of filter weights within the sub-tile of the same color, and is defined according to the following expressions (5) and (6):

$$\gamma = \frac{1}{4} \sum_c \gamma_c \quad (5)$$

$$\gamma_c = \frac{\sum_{c\,sub\text{-}tile} (\text{filter coefficients for } c \text{ colored pixels})^2}{\sum_{all\,sub\text{-}tiles} (\text{filter coefficients for } c \text{ colored pixels})^2} \quad (6)$$

For a filter of color c where the weights are completely concentrated within the c sub-tile (that is, with non-zero weights only inside the c sub-tile), $\gamma_c$ achieves a maximum value of 1. Accordingly, each $\gamma_c$ has a possible range of values between 0 and 1, and hence γ is also between 0 and 1.

The second component β measures the deviation of the center of gravities of the filter weights from the geometric pixel centers of the output image; that is, geometric pixel centers of a lower resolution virtual grid. It is defined according to the following expressions (7) and (8):

$$\beta = \max\left(1 - \frac{1}{4}\sum_c D_c, 0\right) \quad (7)$$

$$D_c = \frac{\sqrt{(d_c^h)^2 + (d_c^v)^2}}{N\Delta} \quad (8)$$

Above, Δ is the length of the input pixel, $d_c^h$ and $d_c^v$ are the horizontal and vertical distances, respectively, between the center of gravity of the filter coefficients for the color c and the geometric pixel center of the c color pixel in the corresponding virtual grid, and N is the integer in the scaling factor (1/N)X. For a filter where the center of gravities of the filter coefficient in all four colors coincide with the geometric pixel center of the output pixel of respective colors, $D_c=0$ for all c and β achieves a maximum value of 1. Hence, β is between 0 and 1.

The calculations of $D_c$ in expression (8) above assume that the pixels have a square shape; that is, both the width and height of the pixels are equal to Δ. In the case of rectangular pixels, the calculations can be performed by first normalizing $d_x^h$ and $d_c^v$ by the width and height, respectively, of the pixel, and then calculating $D_c$ as the root mean square of the normalized values.

To consider the overall effect of both γ and β, Bayer-consistency coefficient C is defined according to the following expression (9):

$$C = \mu\gamma + (1-\mu)\beta \quad (9)$$

The parameter μ has a value between 0 and 1, and is used as a weight for the two components γ and β. Therefore, as is readily apparent, C has a possible range of values between 0 and 1. For performance evaluation, μ=0.5 may be used. The performance evaluation parameter μ has a value between 0 and 1, and is used as a weight for the two components γ and β. In the above expression, a high γ indicates a high degree of image sharpness, whereas a high β indicates an image free from jagged edges. A value of μ=0.5 is chosen for a balance between image sharpness and an image free of jagged edges. Using this definition, raw scaling filters with higher values of C are preferred. In other words, filters which exhibit a higher degree of Bayer-consistency lead to higher image quality; for example, having C≥0.65. More preferably, C≥0.8. Most preferably, C>0.9.

For comparison, consider the pixel skipping and binning scaling methods described above. For pixel skipping at a scaling factor of (½)X, the values of $\gamma_c$ are 1, 0, 0, 0 for the colors R, G1, G2, and B, respectively. Therefore, γ=0.25. Additionally, it can be calculated that the horizontal distance $d_c^h$ equals 0.5Δ, 1.5Δ, 0.5Δ, and 1.5Δ for R, G1, G2, and B, respectively; whereas the vertical distance $d_c^v$ equals 0.5Δ, 0.5Δ, 1.5Δ, and 1.5Δ for R, G1, G2, and B, respectively. Accordingly, β=0.2512. Using μ=0.5 for evaluation, the Bayer consistency coefficient C for pixel skipping is 0.2506 for a scaling factor of (½)X. By similar calculations, the Bayer consistency coefficient C for pixel skipping equals 0.1258 for (⅓)X and 0.1250 for (¼)X.

For binning at a scaling factor of (½)X, $\gamma_c$ is $(¼^2)/(¼^2+¼^2+¼^2+¼^2)$—that is, 0.25—for each color c, and therefore γ=0.25. Both the horizontal distance $d_c^h$ and the vertical distance $d_c^v$ equal 0.5Δ for any color c, and therefore β=0.6464. Again using μ=0.5 for evaluation, the Bayer consistency coefficient C for binning is 0.4482 for a scaling factor of (½)X. By similar calculations, the Bayer consistency coefficient C for binning equals 0.4865 for (⅓)X and 0.3598 for (¼)X.

On the other hand, a BCRS filter configured to satisfy the three Bayer consistency conditions defined above provides a high Bayer consistency coefficient value and good image quality. FIG. 8 provides an example of such a filter for a scaling factor of (⅓)X. For the particular filter illustrated in FIG. 8, $\gamma_c$ is $(¼^2+¼^2+¼^2+¼^2)/(¼^2+¼^2+¼^2+¼^2)$ for any c. Therefore, $\gamma_c$ is 1 for any color c. Additionally, $D_c$=0 for any color c. As a result, C achieves its highest possible value of 1. An extension to general scaling factors (1/N)X for any integer N which achieves the maximum value of C=1 is straightforward.

[Optimized Bayer-Consistent Scaling]

Pure BCRS can potentially produce some false colors in the high frequency areas of the output images, which can be observed from processing images of resolution charts. This is due to the maintenance of very high resolution in the scaled output images. To make further improvements, the filter coefficients may be optimized. The optimization procedure for each color c involves allowing some coefficients outside of the c sub-tile to take on a non-zero value which is substantially smaller than the coefficient values inside the c sub-tile, and in the process evaluating the resulting Bayer consistency coefficient C and false coloring in the output image. While this optimization procedure implies that condition (2) described above no longer holds in a strict sense, the overall Bayer consistency coefficient C is still evaluated in the optimization to ensure a high C value so that a majority of the weights of the filter remains inside the sub-tile of the same color.

Figure 9:
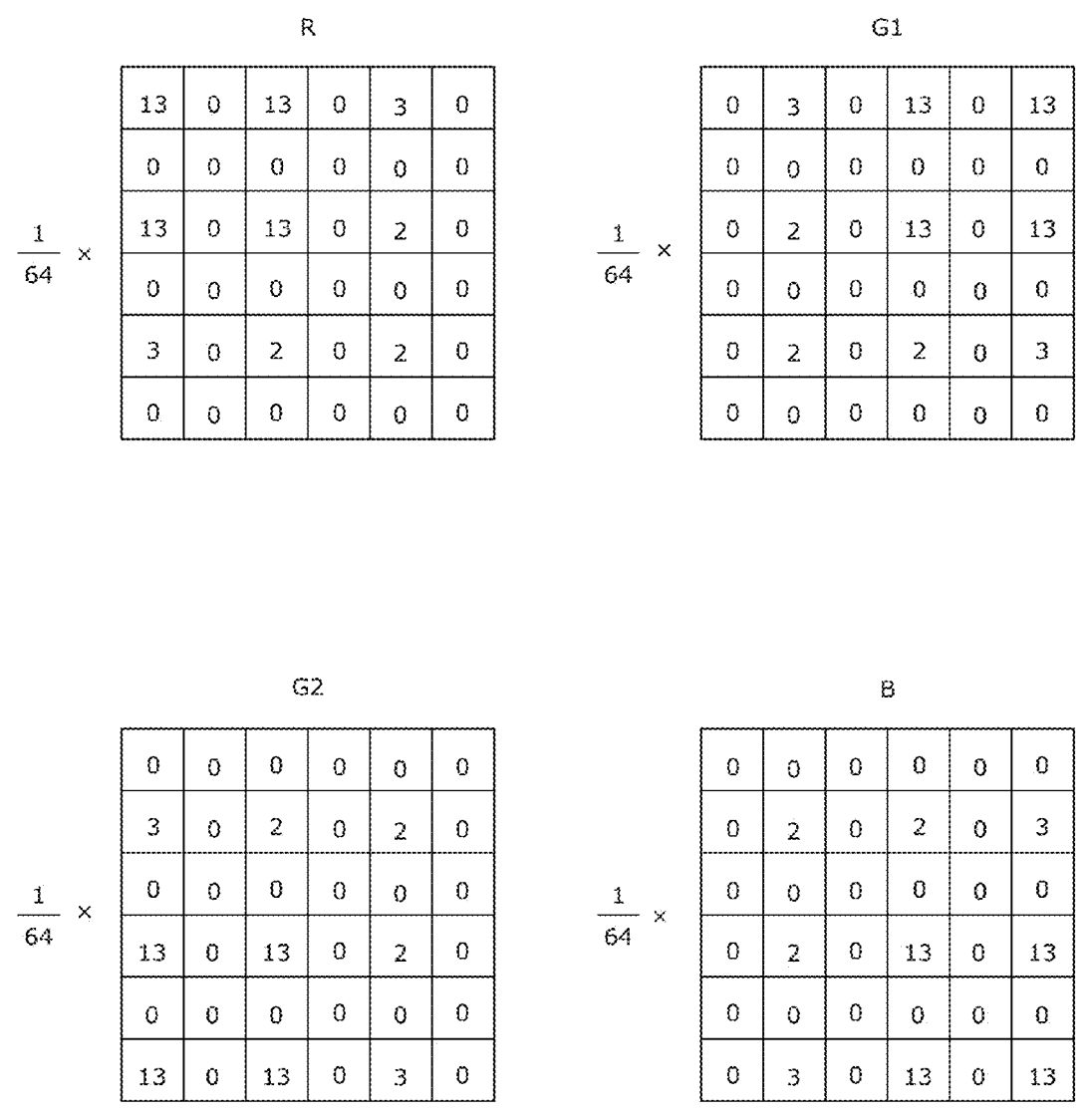

FIG. 9 illustrates an example of an optimized filter for a scaling factor of (⅓)X. For the filters in FIG. 9, γ, $d_c^h$, and $d_c^v$ are determined in the following expressions (10) and (11):

$$\gamma = \gamma_c = \frac{4 \times \left(\frac{13}{64}\right)^2}{4 \times \left(\frac{13}{64}\right)^2 + 2 \times \left(\frac{3}{64}\right)^2 + 3 \times \left(\frac{2}{64}\right)^2} = 0.9575 \quad (10)$$

$$d_c^h = d_c^v = \frac{(-1)(2 \times 13 + 3) + (2 \times 13 + 2) + (3)(3 + 2 \times 2)}{64} = 0.3125 \quad (11)$$

The above values hold for any color c, and therefore β=0.8527. Evaluating at μ=0.5, these components lead to a Bayer consistency coefficient of 0.9051, which is both close to the maximum possible value of 1 and much higher than the corresponding values for pixel skipping (0.1258) and binning (0.4865) for a scaling factor (⅓)X.

Figure 10A:
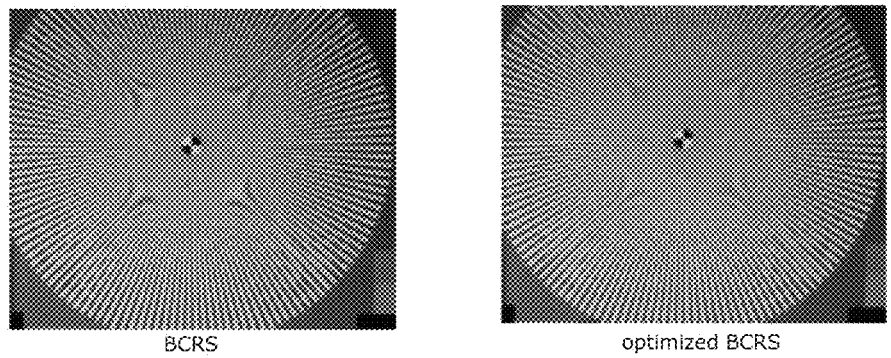
FIGS. 10A, 10B, and 10C respectively illustrate an exemplary comparison between scaling methods according to various aspects of the present disclosure.
Figure 10B:
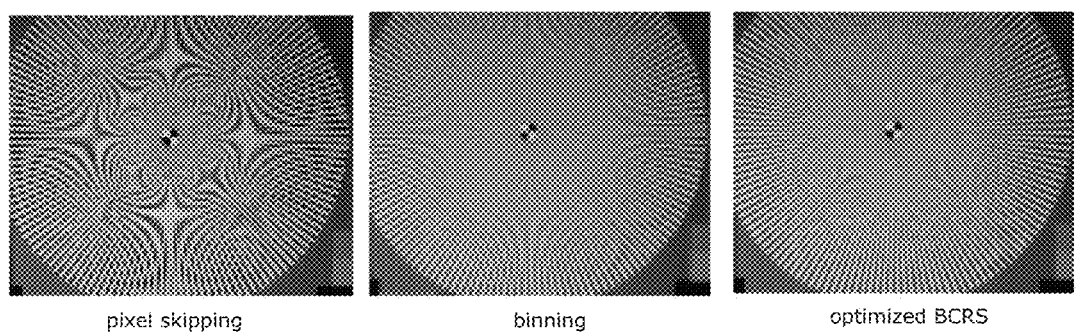
Figure 10C:
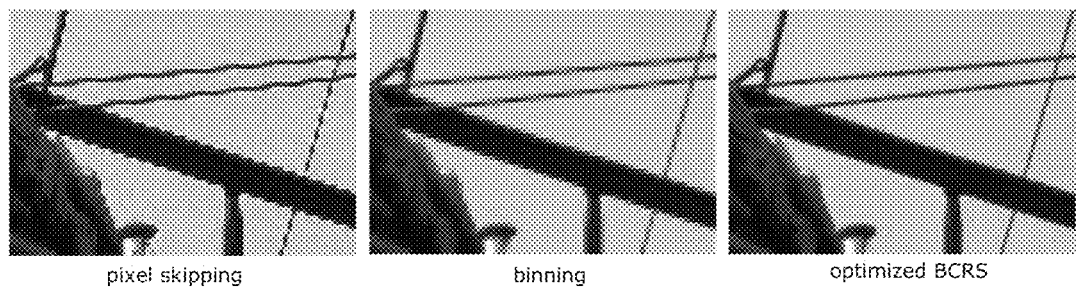

FIGS. 10A-C illustrates a comparison between the scaling methods described above.

Specifically, FIG. 10A compares the BCRS filter shown in FIG. 8 (on the left) with the optimized BCRS filter shown in FIG. 9 (on the right). Using the optimized BCRS filter results in a significant reduction in false coloring with no loss in resolution.

FIGS. 10B and 10C compare three different scaling methods at a scaling factor of (⅓)X: on the left is pixel skipping; in the middle is binning; and on the right is optimized BCRS using the filter shown in FIG. 9. In each case the images were scaled in the raw domain, the scaled raw data was then domasaiced, and finally color correction and gamma correction were applied. It can be readily observed from FIGS. 10B and 10C that optimized BCRS gives output images with the best resolution and least distortion. In particular, optimized BCRS produces output color pixels that are consistent with the Bayer array of a lower resolution virtual sensor and, therefore, it maintains the correct phase relationship without mixing G1 and G2 pixels. Consequently, optimized BCRS produces raw image output that maintains high resolution details.

Figures 11, 12, 13:
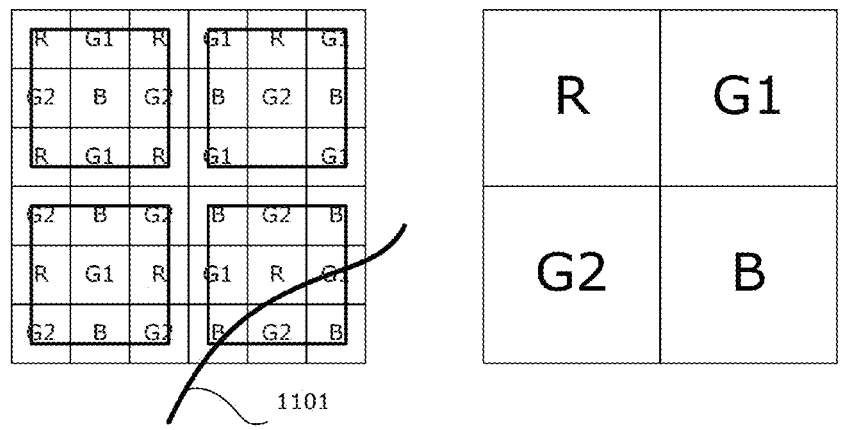
FIG. 11 illustrates an exemplary effect of an edge in an input raw image according to various aspects of the present disclosure.
FIG. 12 illustrates an exemplary (½)X scaling operation according to various aspects of the present disclosure.
FIG. 13 illustrates an exemplary (¼)X scaling operation according to various aspects of the present disclosure.

BCRS is especially effective because the Bayer consistency conditions require that the structural information (for example, edges) of the captured images be localized and kept at the correct locations in the scaled image. This is illustrated by FIG. 11. Specifically, FIG. 11 shows an edge 1101 in the scene appearing in the lower right portion of the pixel area. If an image including edge 1101 were to be scaled down by the binning method, the effect of the edge would affect all four output pixels because pixels within the edge area are used in calculating the output raw pixels of all colors. In this case the output R, G1, and G2 pixels, even though located outside of the area containing edge 1101, are affected by the presence of edge 1101. This means that the edge 1101 is spread out into the entire 2×2 output area, which corresponds to the entire 6×6 input area. On the other hand, by using BCRS (for example, using the filters of FIG. 8), only the R pixels in the R sub-tile are used in the calculation of the output R pixel value. Therefore, the output R value is not affected by the presence of edge 1101. Similarly, the output G1 and G2 values are not affected by edge 1101. That is, because edge 1101 is confined to the β sub-tile, only the output β value is affected by edge 1101. In this manner, BCRS preserves the structure of the image more accurately and produces output images of high resolution.

Although, in optimized BCRS (for example, using the filters of FIG. 9), pixels outside of the c sub-tile are used in the calculation of the output c-colored pixel, the structural limitation is similarly preserved because the filter weights of the pixels outside of the same color sub-tile are comparatively low.

Optimized BCRS filters may also be used to scale at scaling factors other than (⅓)X; for example, any (1/N)X for integer N. For example, FIG. 12 illustrates an exemplary optimized BCRS red filter coefficient array for scaling factor (½)X; whereas FIG. 13 illustrates an exemplary optimized BCRS red filter coefficient array for scaling factor (¼)X. Using the above expressions at μ=0.5, the BCRS filter arrays of FIGS. 12 and 13 give a Bayer consistency coefficient C of 0.8279 and 0.8166, respectively. These are much higher than the Bayer consistency coefficients C for both pixel skipping and binning as described above.

Figure 14:
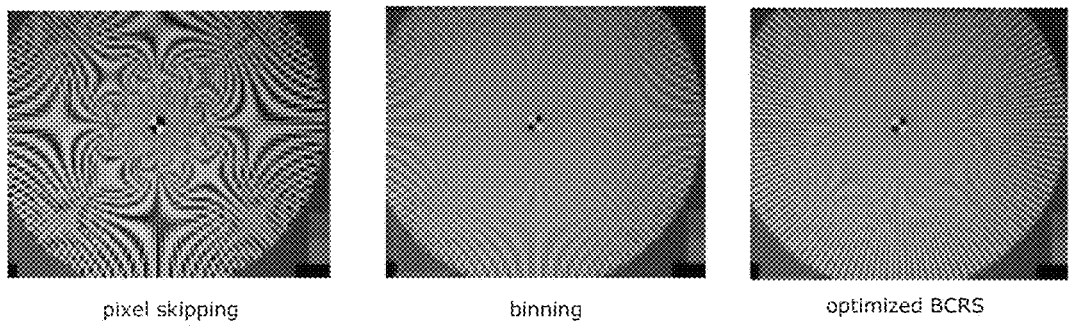
FIG. 14 illustrates an exemplary comparison between (¼)X scaling methods for a circular resolution chart according to various aspects of the present disclosure.
Figure 15:
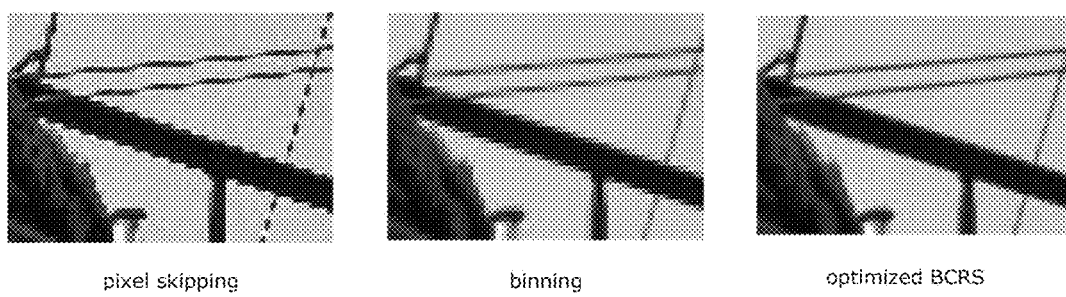
FIG. 15 illustrates an exemplary comparison between (¼)X scaling methods for a natural image according to various aspects of the present disclosure.

FIGS. 14 and 15 illustrate an exemplary comparison between these scaling methods at a scaling factor of (¼)X: on the left is pixel skipping; in the middle is binning; and on the right is optimized BCRS. As is apparent from FIGS. 14 and 15, optimized BCRS produces superior results to both pixel skipping and binning.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of scaling an image comprising:
   receiving raw image data comprising a plurality of input pixel values, respective ones of the input pixel values corresponding to a respective pixel of an image sensor; and
   filtering respective ones of the plurality of pixels according to a Bayer-consistent ruleset,
   wherein the Bayer-consistent ruleset results in a Bayer-consistency coefficient C of greater than or equal to 0.65, where C is defined according to the following expression (1):

$$C = 0.5\gamma + 0.5\beta \quad (1),$$

where $\gamma$ and $\beta$ are defined according to the following expressions (2) and (3), respectively:

$$\gamma = \frac{1}{4} \sum_{c} \frac{\sum_{c\,sub\text{-}tile} (\text{filter coefficients for } c \text{ colored pixels})^2}{\sum_{all\,sub\text{-}tiles} (\text{filter coefficients for } c \text{ colored pixels})^2}, \quad (2)$$

$$\beta = \max\left(1 - \frac{1}{4}\sum_{c} \frac{\sqrt{(d_c^h)^2 + (d_c^v)^2}}{N\Delta}, 0\right), \quad (3)$$

where $d_c^h$ and $d_c^v$ are the horizontal and vertical distances, respectively, between a center of gravity of the filter coefficients for the color c and a geometric pixel center of a corresponding c color output pixel, N is a scaling factor, and $\Delta$ is a length of an input pixel.

2. The method according to claim 1, further comprising: outputting scaled image data comprising a plurality of output pixel values, respective ones of the output pixel values corresponding to a subgroup of the plurality of input pixel values.

3. The method according to claim 1, wherein the Bayer-consistent ruleset includes a rule that a respective output pixel value corresponds to a first color, and a corresponding subgroup of the plurality of input pixel values also corresponds to the first color.

4. The method according to claim 1, wherein
   the plurality of input pixel values corresponds to a plurality of input sub-tiles, and
   the Bayer-consistent ruleset includes a plurality of filter weights, wherein the filter weights are concentrated within an input sub-tile of the same color as a corresponding output pixel value.

5. The method according to claim 1, wherein the Bayer-consistent ruleset includes a plurality of filter weights, wherein a center of gravity of the filter weights for each color coincides with the geometric pixel center of an output pixel of the same color.

6. The method according to claim 1, wherein C is greater than or equal to 0.8.

7. The method according to claim 1, further comprising: in the step of filtering, converting the raw image data from an analog data to a digital data.

8. An image processing circuit, comprising:
   an image scaling circuit including:
      input circuitry configured to receive raw image data comprising a plurality of input pixel values, respective ones of the input pixel values corresponding to a respective pixel of an image sensor; and
      filter circuitry configured to filter respective ones of the plurality of pixels according to a Bayer-consistent ruleset,
   wherein the Bayer-consistent ruleset results in a Bayer-consistency coefficient C of greater than or equal to 0.65, where C is defined according to the following expression (1):

$$C = 0.5\gamma + 0.5\beta \quad (1),$$

where γ and β are defined according to the following expressions (2) and (3), respectively:

$$\gamma = \frac{1}{4}\sum_c \frac{\sum_{c\,sub\text{-}tile}(\text{filter coefficients for } c \text{ colored pixels})^2}{\sum_{all\,sub\text{-}tiles}(\text{filter coefficients for } c \text{ colored pixels})^2}, \quad (2)$$

$$\beta = \max\left(1 - \frac{1}{4}\sum_c \frac{\sqrt{(d_c^h)^2 + (d_c^v)^2}}{N\Delta}, 0\right), \quad (3)$$

where $d_c^h$ and $d_c^v$ are the horizontal and vertical distances, respectively, between a center of gravity of the filter coefficients for the color c and a geometric pixel center of a corresponding c color output pixel, N is a scaling factor, and Δ is a length of an input pixel.

9. The image processing circuit according to claim 8, further comprising:
   output circuitry configured to output scaled image data comprising a plurality of output pixel values, respective ones of the output pixel values corresponding to a subgroup of the plurality of input pixel values.

10. The image processing circuit according to claim 8, wherein the Bayer-consistent ruleset includes a rule that a respective output pixel value corresponds to a first color, and a corresponding subgroup of the plurality of input pixel values also corresponds to the first color.

11. The image processing circuit according to claim 8, wherein
   the plurality of input pixel values corresponds to a plurality of input sub-tiles, and
   the Bayer-consistent ruleset includes a plurality of filter weights, wherein the filter weights are concentrated within an input sub-tile of the same color as a corresponding output pixel value.

12. The image processing circuit according to claim 8, wherein the Bayer-consistent ruleset includes a plurality of filter weights, wherein a center of gravity of the filter weights for each color coincides with the geometric pixel center of an output pixel of the same color.

13. The image processing circuit according to claim 8, wherein C is greater than or equal to 0.8.

14. The image processing circuit according to claim 8, wherein the image scaling circuit further includes an analog-to-digital converter.

15. An imaging device, including:
   an image sensor including a plurality of pixels; and
   an image scaling circuit including:
      input circuitry configured to receive raw image data comprising a plurality of input pixel values, respective ones of the input pixel values corresponding to a respective pixel of the image sensor; and
      filter circuitry configured to filter respective ones of the plurality of pixels according to a Bayer-consistent ruleset,
   wherein the Bayer-consistent ruleset results in a Bayer-consistency coefficient C of greater than or equal to 0.65, where C is defined according to the following expression (1):

$$C = 0.5\gamma + 0.5\beta \quad (1),$$

where γ and β are defined according to the following expressions (2) and (3), respectively:

$$\gamma = \frac{1}{4}\sum_c \frac{\sum_{c\,sub\text{-}tile}(\text{filter coefficients for } c \text{ colored pixels})^2}{\sum_{all\,sub\text{-}tiles}(\text{filter coefficients for } c \text{ colored pixels})^2}, \quad (2)$$

$$\beta = \max\left(1 - \frac{1}{4}\sum_c \frac{\sqrt{(d_c^h)^2 + (d_c^v)^2}}{N\Delta}, 0\right), \quad (3)$$

where $d_c^h$ and $d_c^v$ are the horizontal and vertical distances respectively, between a center of gravity of the filter coefficients for the color c and a geometric pixel center of a corresponding c color output pixel, N is a scaling factor, and Δ is a length of an input pixel.

16. The imaging device according to claim 15, further comprising:
   output circuitry configured to output scaled image data comprising a plurality of output pixel values, respective ones of the output pixel values corresponding to a subgroup of the plurality of input pixel values.

17. The imaging device according to claim 15, wherein the Bayer-consistent ruleset includes:
   a plurality of filter weights;
   a first rule that a respective output pixel value corresponds to a first color, and the corresponding subgroup of the plurality of input pixel values also corresponds to the first color;
   a second rule that the plurality of input pixel values corresponds to a plurality of input sub-tiles and the filter weights for the first color are concentrated within an input sub-tile of the same color; and
   a third rule that a center of gravity of the filter weights for the first color coincides with the geometric pixel center of the output pixel of the first color.

18. The imaging device according to claim 15, wherein C is greater than or equal to 0.8.

* * * * *